(12) United States Patent
Fujiwara et al.

(10) Patent No.: US 6,266,606 B1
(45) Date of Patent: Jul. 24, 2001

(54) CONTROL SYSTEM FOR INTERNAL COMBUSTION ENGINE

(75) Inventors: Morio Fujiwara; Atsuko Hashimoto, both of Tokyo; Tatsuhiko Takahashi, Hyogo; Satoshi Wachi, Tokyo, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/739,837

(22) Filed: Dec. 20, 2000

Related U.S. Application Data

(62) Division of application No. 09/416,946, filed on Oct. 13, 1999.

(30) Foreign Application Priority Data

Apr. 22, 1999 (JP) .................................................. 11-114636

(51) Int. Cl.$^7$ ................................ F01L 1/34; F02D 41/22
(52) U.S. Cl. ........................................ 701/114; 123/90.15
(58) Field of Search .................................... 701/101, 102, 701/114, 115; 123/90.15; 73/116, 118.1, 119 R

(56) References Cited

U.S. PATENT DOCUMENTS

| 5,664,529 | 9/1997 | Kato et al. | ........................ 123/90.15 |
| 5,715,779 | 2/1998 | Kato et al. | ........................ 123/90.15 |

FOREIGN PATENT DOCUMENTS 8-200020   8/1996   (JP) .

*Primary Examiner*—Andrew M. Dolinar
(74) *Attorney, Agent, or Firm*—Sughrue, Mion, Zinn, Macpeak & Seas, PLLC

(57) ABSTRACT

A control system for an internal combustion engine which can judge and detect a failure of a valve timing changing unit regardless of operating conditions. The system includes a second storage unit 9 for storing the detection value of an actual valve timing detection unit 2 when the target advance angle set by a target advance angle setting device 3 is a predetermined value and updating the storage value, a storage value update inhibiting unit 10 for inhibiting the update of the storage value of the second storage unit when a change in the storage value updated by a first storage unit 4 is larger than a predetermined value, and failure judging unit 8A for judging a failure of the valve timing changing unit based on the target advance angle set, the detection value of the actual valve timing detection unit and the storage value of the second storage unit.

3 Claims, 9 Drawing Sheets

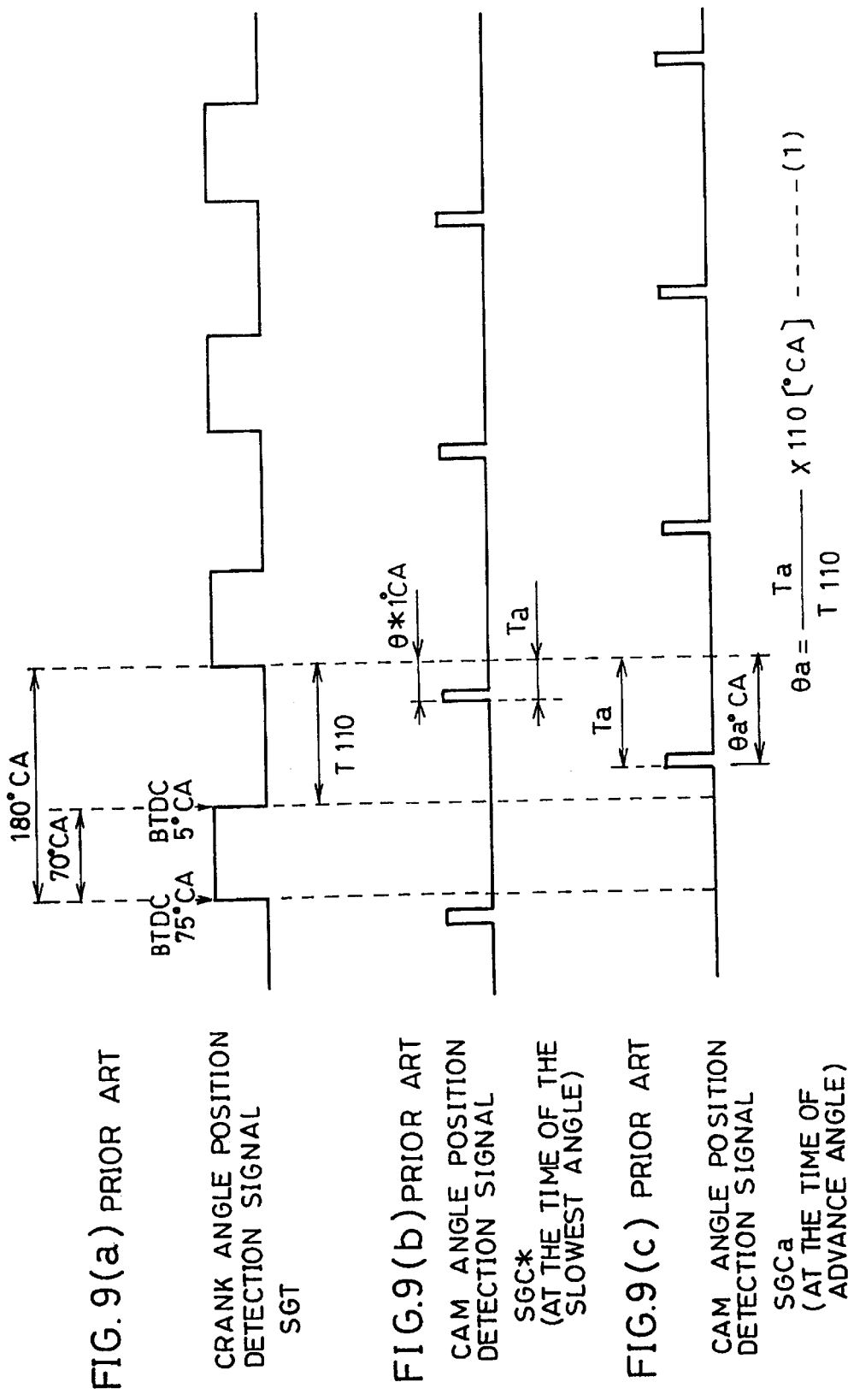

CONTROL SYSTEM FOR INTERNAL COMBUSTION ENGINE

This is a divisional of application Ser. No. 09/416,946 filed Oct. 13, 1999, the disclosure of which is incorporated herein by reference.

BACKGROUND OF THE INVENTION

1. Field of the Invention

The present invention relates to a control system for an internal combustion engine comprising a valve timing changing unit and, particularly, to judgment on a fail of a valve timing changing unit.

2. Description of the Prior Art

FIG. 7 is a structural diagram of a prior art control system for an internal combustion engine. In FIG. 7, a system for changing only the opening or closing timing of a general intake valve as an example.

In FIG. 7, reference numeral 100 denotes a cylinder, 101 a piston which reciprocates in the cylinder 100, 102 an ignition coil, 103 an intake pipe, 104 an exhaust pipe, 105 an injector, 106 an $O_2$ sensor, 107 a water temperature sensor and 108 a throttle valve.

As shown in FIG. 7, as for the configuration of an internal combustion engine comprising a valve timing changing unit, an intake valve 117 and an exhaust valve 118 for sucking and exhausting air are provided in the top portion of the cylinder 100 in which combustion is carried out, an intake cam shaft 115 for opening or closing the intake valve 117 is arranged above the intake valve 117, and an exhaust cam shaft 119 for opening or closing the exhaust valve 118 is disposed above the exhaust valve 118.

A hydraulic actuator (to be abbreviated as "VVT ACT" hereinafter) which is driven by the lubricating oil of the engine is connected to the end surface of the intake cam shaft 115. This VVT ACT 114 changes the valve opening/closing timing of the intake valve 117 continuously by varying the displacement angle of the intake cam shaft 115 from a timing pulley 120 on an intake side.

An oil control valve (to be abbreviated as "OCV" hereinafter) 121 supplies hydraulic oil to the VVT ACT 114 and controls the amount of hydraulic oil to drive the VVT ACT 114 so as to change the valve timing.

Figure 8:
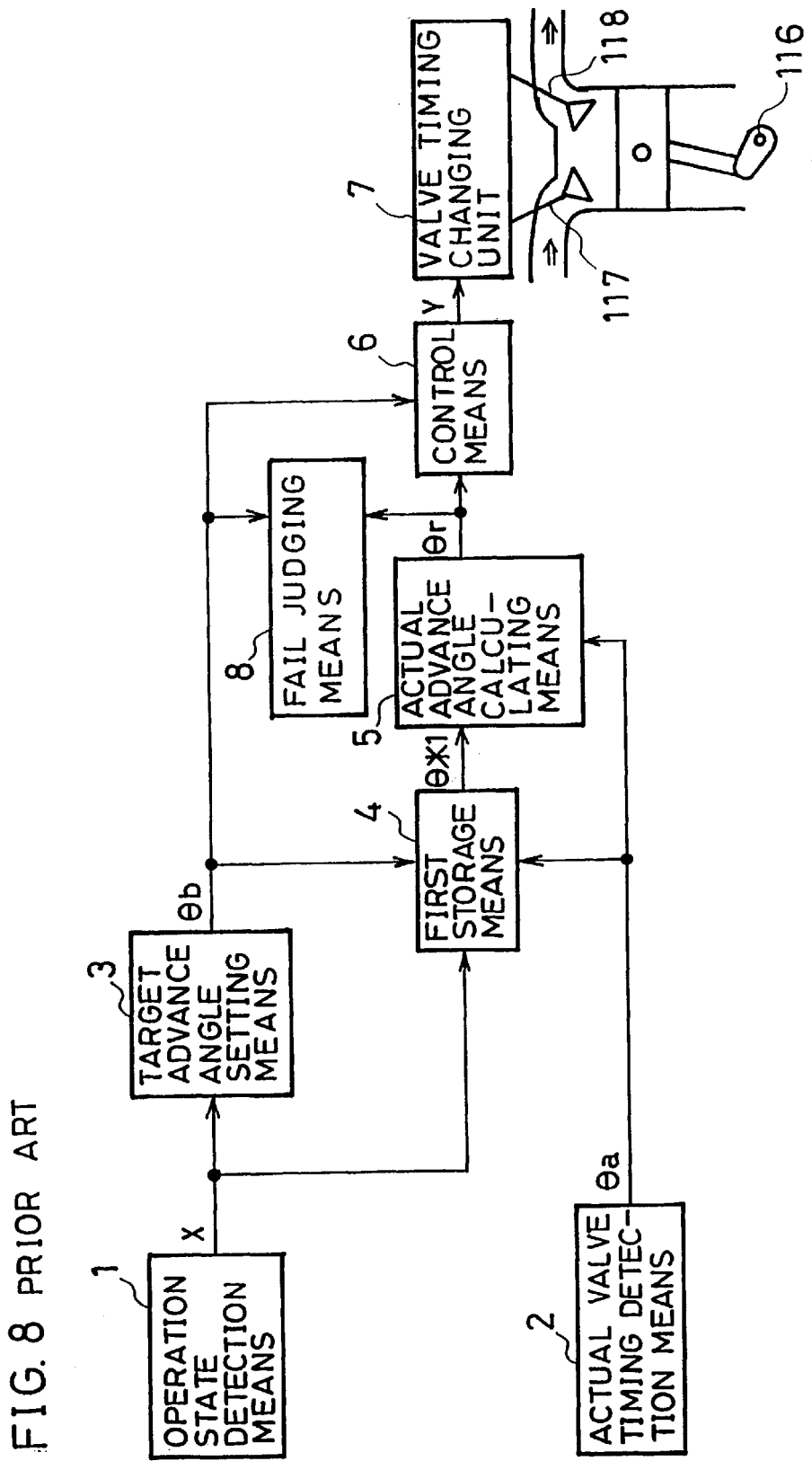
FIG. 8 is a block diagram showing an example of an engine control unit (to be abbreviated as "ECU" hereinafter) as a prior art control system for an internal combustion engine.

In FIG. 8, reference numeral 1 denotes operation state detection means. This operation state detection means 1 detects the operation state of an engine from the output signals of sensors such as a crank angle position detection sensor 110 for detecting the engine speed of an engine, a throttle opening detection sensor 112, a pressure sensor 113 and a water temperature sensor 107.

Denoted by 2 is actual valve timing detection means. This actual valve timing detection means 2 detects the position of actual valve timing from the output signals of the crank angle position detection sensor 110 and a cam angle position detection sensor 111.

Reference numeral 3 represents target advance angle setting means. This means sets the optimal target valve timing for the operation state of the engine based on the detection result X of the operation state detection means 1 and the optimal target valve timing is mapped based on engine speed and filling efficiency, or engine speed and throttle opening in advance. For example, when a predetermined operation condition such as a water temperature higher than a predetermined temperature (for example, 0° C. or more) is satisfied, this map is retrieved and the optimal target advance angle θb is set by carrying out interpolation calculation and when the predetermined operation condition is not satisfied, the target advance angle is fixed at a basic position (for example, the position of the slowest angle on an intake side and the position of the most advance angle on an exhaust side).

Reference numeral 4 denotes first storage means for storing the detection value θa of the actual valve timing detection means 2 when the target advance angle θb set by the target advance angle setting means 3 based on a predetermined operation condition such as idling is a predetermined value which is the basic position (for example, the position of the slowest angle on an intake side and the position of the most advance angle on an exhaust side).

Reference numeral 5 signifies actual advance angle calculating means for calculating the actual advance angle θr of the valve from the detection value θa of the actual valve timing detection means 2 and the storage value θ*1 of the first storage means 4.

Denoted by 6 is control means for controlling the valve timing changing unit 7 such that the actual advance angle θr calculated by the actual advance angle calculating means 5 should converge to the target advance angle θb set by the target advance angle setting means 3 and for carrying out feed-back control based on a difference between the actual advance angle θr and the target advance angle θb to output a control signal Y according to the amount of control.

The valve timing changing unit 7 consists of the above VVT ACT 114 for continuously changing the phase of the intake cam shaft 115 with respect to a crank shaft 116 and the above OCV 121 for driving and controlling the VVT ACT 114.

The OCV 121 consists of a spool valve for switching an oil passage to the VVT ACT 114 and a linear solenoid for controlling the position of the spool valve. A current to be supplied to this OCV 121 is controlled by a control signal from the control means 6 such that the amount of hydraulic oil should be adjusted by switching the oil passage to the VVT ACT 114 to drive the VVT ACT 114 so as to change the valve timing.

Reference numeral 8 denotes fail judging means. This means judges a fail (abnormality) of the valve timing changing unit 7 based on the target advance angle θb set by the target advance angle setting means 3 and the actual advance angle θr calculated by the actual advance angle calculating means 5.

A description is subsequently given of the actual valve timing detection operation of the actual valve timing detection means 2 with reference to FIG. 9.

FIGS. 9 (a), (b), and (c) are timing charts showing a crank angle position detection signal (to be abbreviated as SGT hereinafter) which is the output signal of the crank angle position detection sensor 110 and a cam angle position detection signal (to be abbreviated as SGC hereinafter) which is the output signal of the cam angle position detection sensor 111. FIG. 9 shows the phase relationship between SGT and SGC and how to calculate an actual valve timing detection value θa. SGC* of FIG. 9(b) is SGC when the valve timing is at the position of the slowest angle and SGC* of FIG. 9(c) is SGC when the valve timing is at the position of the advance angle.

The ECU 122 measures a time $T_{110}$ corresponding to 110° CA (the displacement angle of the crank shaft when the crank shaft turns once per 1 rotation of the cam shaft) in SGT of FIG. 9(a) and a phase difference time Ta between SGC and SGT to obtain an actual valve timing detection value θa from the following equation (1) at each SGT timing (for example, every BTDC (before top dead center) 75° CA).

$$\theta a = Ta/T_{110} \times 110 [°CA] \quad (1)$$

Under the condition of a stable predetermined operation state such as idling, the actual valve timing detection value θa when the target advance angle is the slowest angle position (θb=0) is stored as a first storage value θ*1 (slowest angle learned value). The slowest angle learned value θ0*1 serves as a reference value for the calculation of the actual advance angle θr of the actual valve timing, is set to absorb a detection difference for each system caused by differences in parts such as the VVT ACT 114, the crank angle position detection sensor 110 and the cam angle position detection sensor 111 and differences in attachment and updated frequently at very short intervals, for example, 25 ms or SGT timing (for example, BTDC 75° CA) for high-accuracy control.

In fact, the slowest angle learned value 0*1 is limited to a range between upper and lower limits in consideration of differences in parts such as the VVT ACT 114, the crank angle position detection sensor 110 and the cam angle position detection sensor 111 and differences in attachment (for example, upper limit value θ*max=45° CA and lower limit value θ*min=5° CA when design center value± difference=25±20°).

That is, the actual advance angle θr which is the advance angle of the actual valve timing based on the slowest angle learned value θ*1 can be obtained from the following equation (2).

$$\theta r = \theta a - \theta^*1 \quad (2)$$

The ECU 122 carries out feed-back control by means of the control means 6 based on a difference between the actual advance angle θr and the target advance angle θb to converge the actual advance angle θr to the target advance angle θb.

Further, the ECU 122 detects a fail of the valve timing changing unit 7 which consists of the VVT ACT 114 and the OCV 121 by the following method.

For example, when a fail (abnormality in the most advance angle) of the valve timing changing unit 7 occurs that the position of the spool valve is fixed by the OCV 121's biting in of foreign matter and the VVT ACT 114 sticks to the valve timing of the most advance angle position of the intake valve (that is, when the intake cam shaft 115 moves to the most advance angle position) during driving, the actual advance angle θr of the actual advance angle calculation means 5 becomes the maximum operation angle θact of the VVT ACT 114. If the maximum operation angle θact of the VVT ACT 114 is 45° CA, θr=θa−θ*1=45° CA.

On the contrary, when such a fail (abnormality in the slowest angle) occurs that the position of the spool valve of the OCT 121 is fixed and the VVT ACT 114 sticks to the valve timing of the slowest angle position of the intake valve, the actual advance angle θr=θa−θ*1=0.

The fail judging means 8 judges and detects that a fail occurs when the difference between the target advance angle θb and the actual advance angle θr, which is larger than a fail decision advance angle θf1 (for example, 20° CA), that is, |θb−θr|>θf1 is continued for a fail decision time tf1 (for example, 5 sec) or more.

That is, although feed-back control is carried out to converge θr to θb, when |θb−θr|>θf1 is continued after the passage of the fail decision time tf1, it is judged that abnormality occurs and a fail is detected.

In the prior art control system for an internal combustion engine, according to an operation condition under which a fail of the valve timing changing unit 7 occurs as described above (for example, a fail (abnormality in the most advance angle) that the VVT ACT 114 sticks to the valve timing of the most advance angle of the intake valve when the target advance angle is the slowest angle position (θb=0) during idling), the storage value (slowest angle learned value) θ*1 of the first storage means 4 is updated and erroneously learned before a fail is judged and detected by the above method, whereby the actual advance angle θr becomes smaller than the actual advance angle (=45° CA) and θr θf1 (=20° CA), thereby making it impossible to carry out fail judgment.

That is, when the valve timing changing unit 7 fails, for example, the position of the spool valve is fixed by the OCV 121's biting in of foreign matter and the VVT ACT 114 sticks to the actual valve timing of the most advance angle position of the intake valve, the fail cannot be detected, thereby making it impossible to confirm deterioration in operation performance such as a reduction in the output of an engine, engine stall or the generation of abnormal vibration, and the occurrence of inconvenience such as deterioration in exhaust gas.

In a technology disclosed by Japanese Laid-open Patent Application No. 8-200020, since the value of actual displacement angle VTB equivalent to the actual valve timing detection value θa is updated as the slowest angle learned value GTV equivalent to the storage value of the first storage means by learning (step S15 of FIG. 4 of Japanese Laid-open Patent Application No. 8-200020), the slowest angle learned value GTV is sequentially updated and erroneously learned. Therefore, the displacement angle VT=VTB−GTV (that is, θr=θa−θ*1 ) equivalent to the above actual advance angle θr becomes smaller than the actual advance angle and θr>θf1, thereby making it impossible to judge a fail.

SUMMARY OF THE INVENTION

It is an object of the present inventor which has been made to solve the above problems to provide a control system for an internal combustion engine which can judge and detect a fail of a valve timing changing unit regardless of operation condition.

According to a first aspect of the present invention, there is provided a control system for an internal combustion engine which comprises second storage means for storing the detection value of actual valve timing detection means when a target advance angle set by target advance angle setting means is a predetermined value, whose storage value is updated, storage value update inhibiting means for inhibiting the update of the storage value of the second storage means when a change in the storage value updated by first storage means is equal to or larger than a predetermined value, and fail judging means for judging a fail of a valve timing changing unit based on the target advance angle set by the target advance angle setting means, the detection value of the actual valve timing detection means and the storage value of the second storage means.

According to a second aspect of the present invention, there is provided a control system for an internal combustion engine which comprises storage value update inhibiting means for inhibiting the update of the storage value of the second storage means when a difference between the storage value of the second storage means and the detection value of the actual valve timing detection means is equal to or larger than a predetermined value, wherein the fail judging means judges a fail of the valve timing changing unit based on the target advance angle, the detection value and the storage value of the second storage means.

In the above control system for an internal combustion engine, the storage value of the second storage means is updated less frequently than the storage value of the first storage means. In concrete terms, the update cycle of the storage value of the second storage means is made longer than the update cycle of the storage value of the first storage means. The ratio of the update cycle of the first storage means to the update cycle of the second storage means is set to 1:4 or more. A filter for updating the storage value of the second storage means less frequently than the storage value of the first storage means is provided in the second storage means.

The predetermined value which is the basis of the update inhibition condition of the storage value update inhibiting means is set to a value equal to or larger than a detection error of the detection value of the actual valve timing detection means when the valve timing changing unit is normal and the valve timing is at the slowest angle position or the most advance angle position.

According to a third aspect of the present invention, there is provided a control system for an internal combustion engine which comprises second storage means for storing the detection value of the actual valve timing detection means when the target advance angle set by the target advance angle setting means is the predetermined value, whose the storage value is updated only once within one operation cycle from start to stop. In concrete terms, the storage value of the second storage means is updated during each idling right after the start of the engine within each operation cycle.

The fail judging means judges that a fail occurs when a difference between the detection value of the actual valve timing detection means when the target advance angle set by the target advance angle setting means is a predetermined value and the storage value of the second storage means, which is equal to or larger than the predetermined value, is continued for a predetermined time or more.

According to a fourth aspect of the present invention, there is provided a control system for an internal combustion engine which comprises second storage means for storing the previous storage value of the first storage means, storage value change detection means for detecting whether a change from the previous storage value stored in the first memory means to the current storage value is equal to or larger than a predetermined value, and fail judging means for judging a fail of the valve timing changing unit based on the target advance angle set by the target advance angle setting means, the detection value of the actual valve timing detection means and the storage value of the second storage means when the storage value change detection means detects that the change is equal to or larger than the predetermined value.

The above and other objects, features and advantages of the invention will become more apparent from the following description when taken in conjunction with the accompanying drawings.

BRIEF DESCRIPTION OF THE ACCOMPANYING DRAWINGS

Figure 1:
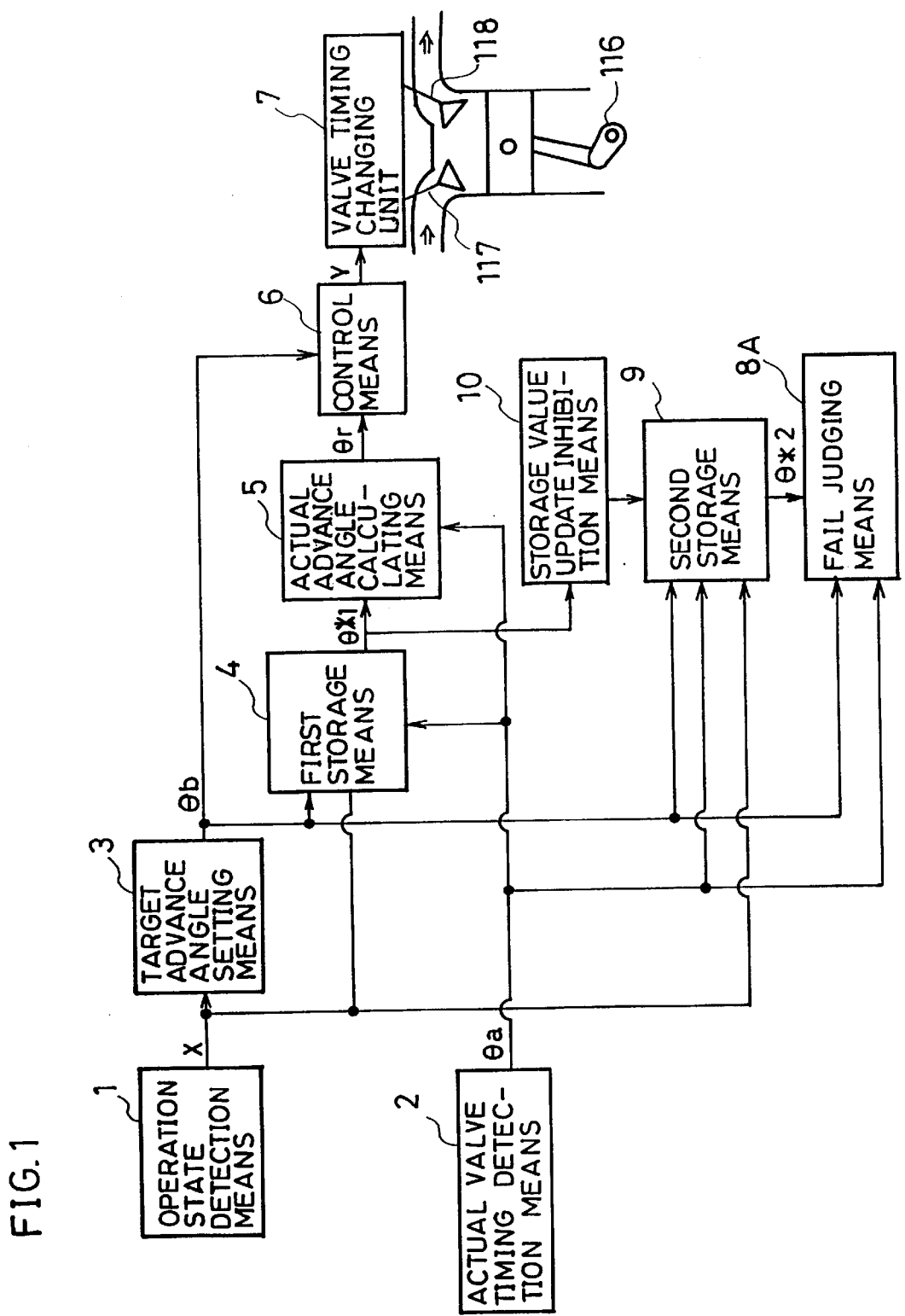
Figure 2:
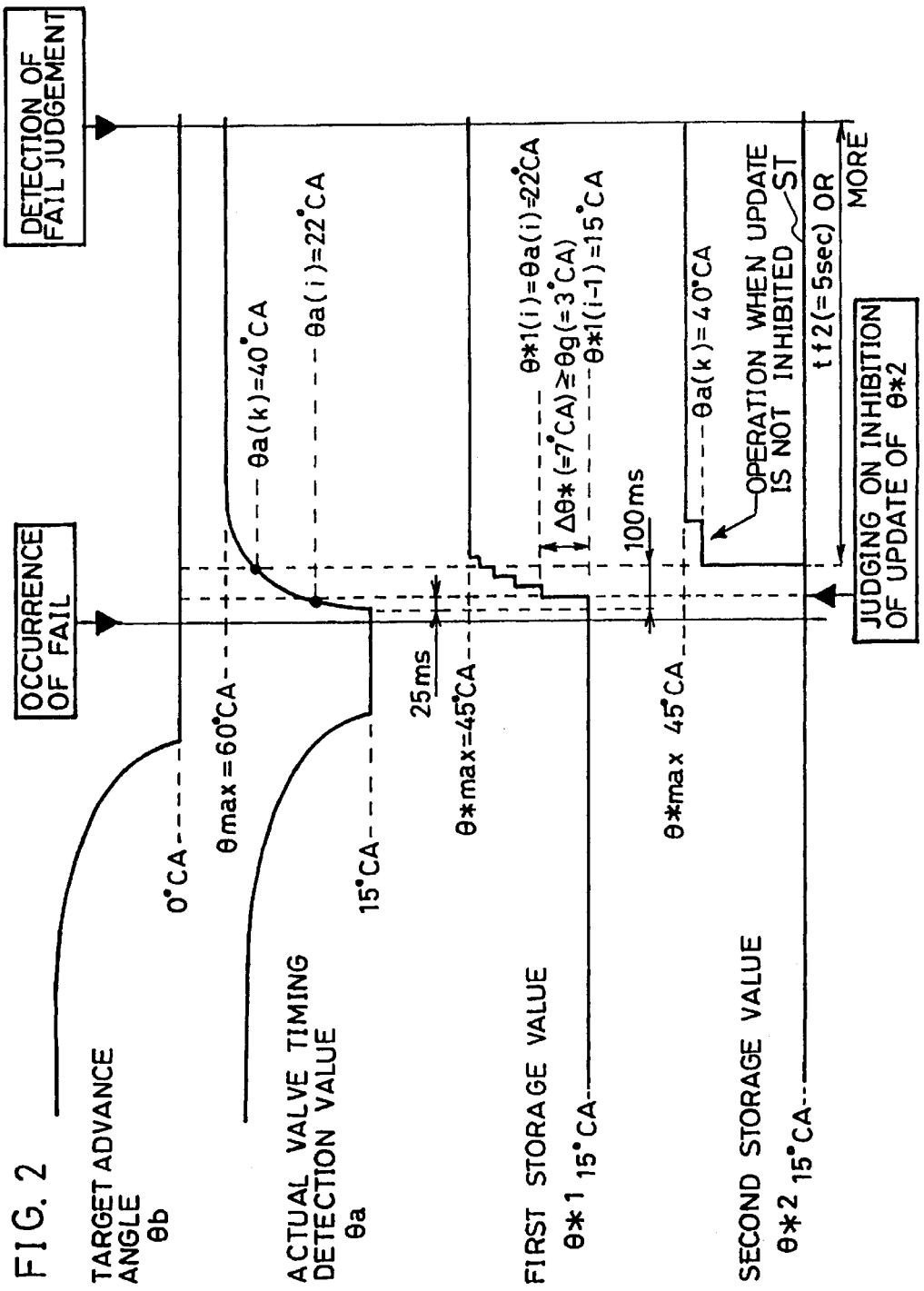
Figure 3:
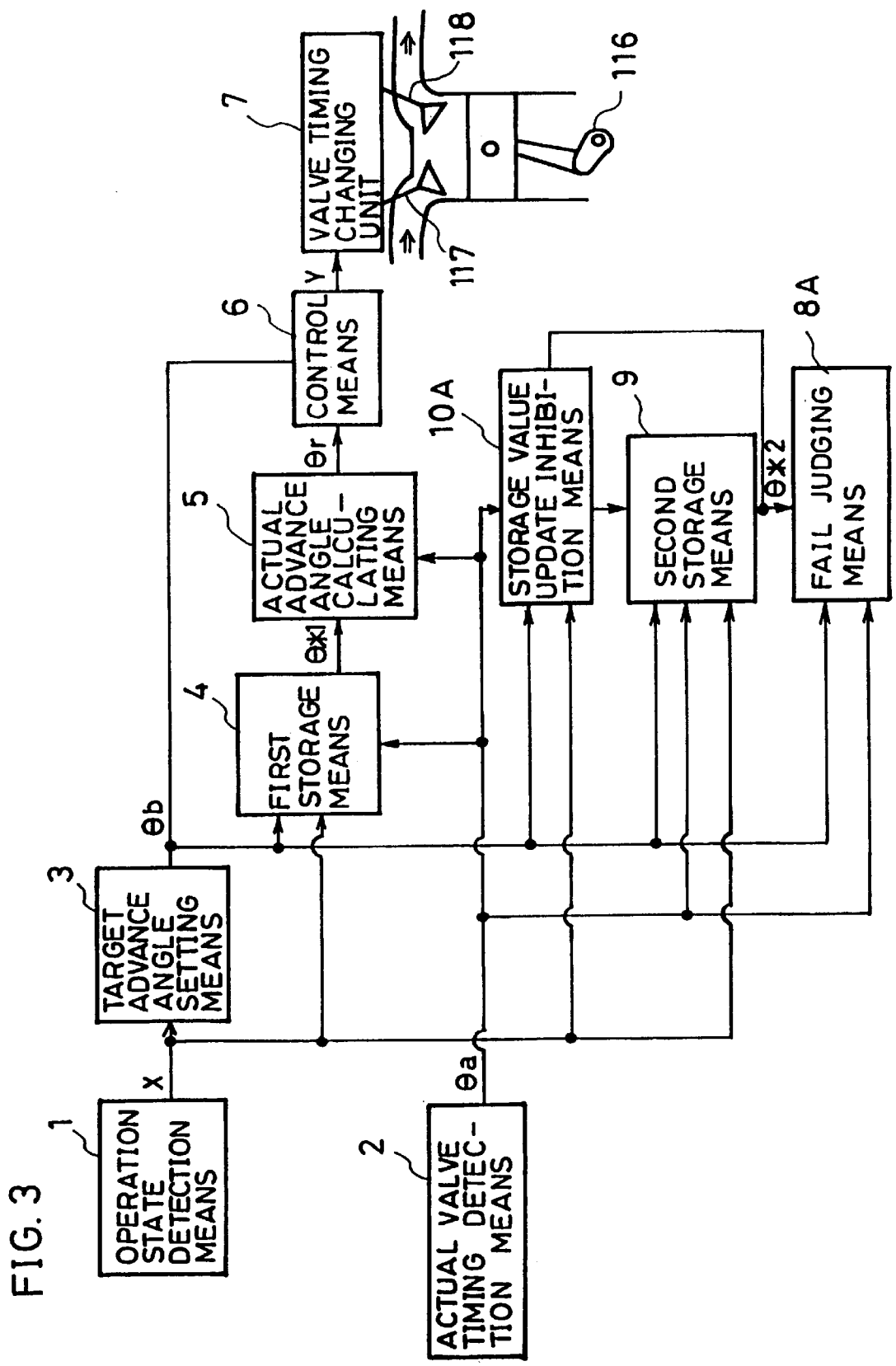
Figure 4:
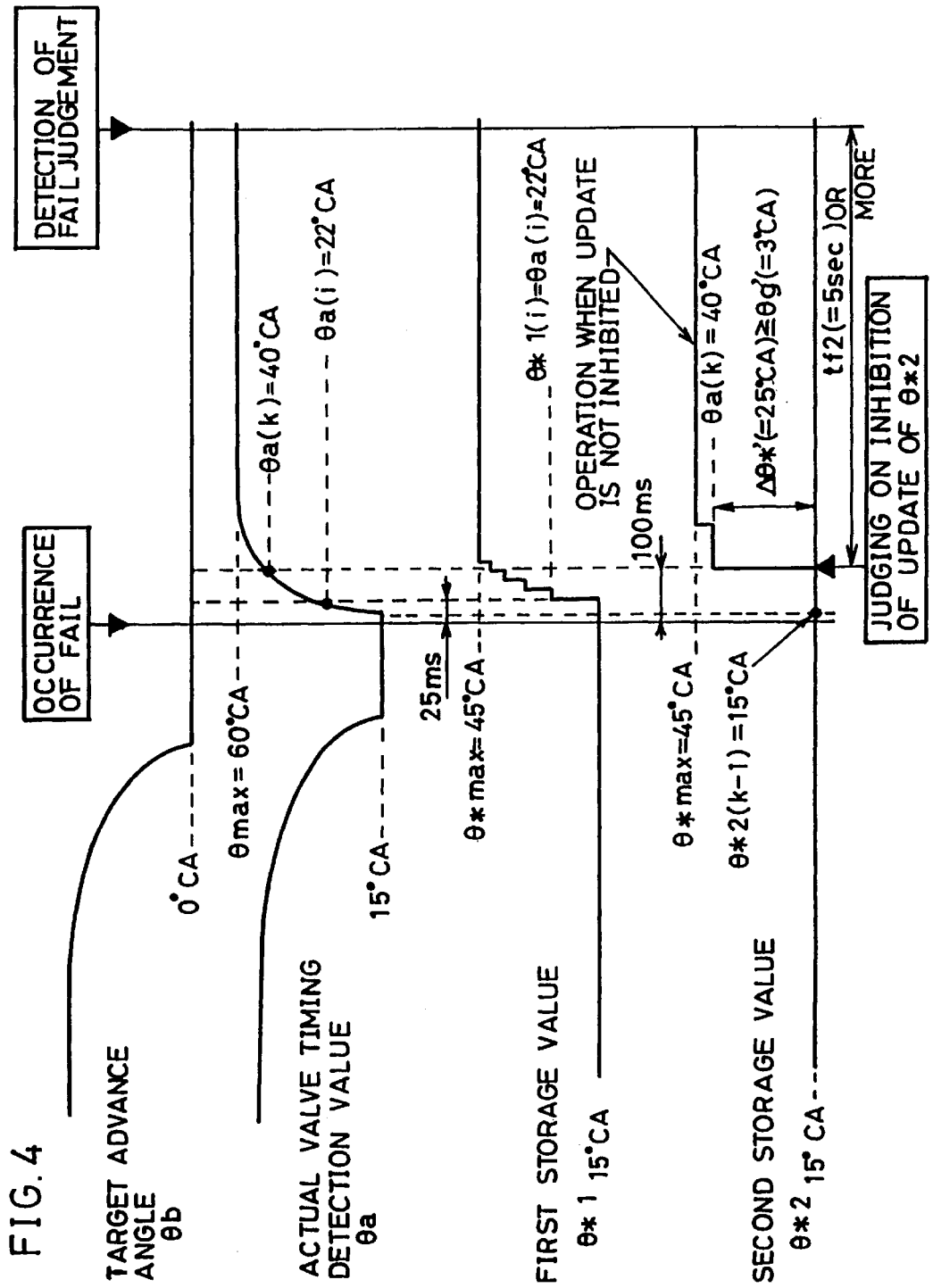
Figure 5:
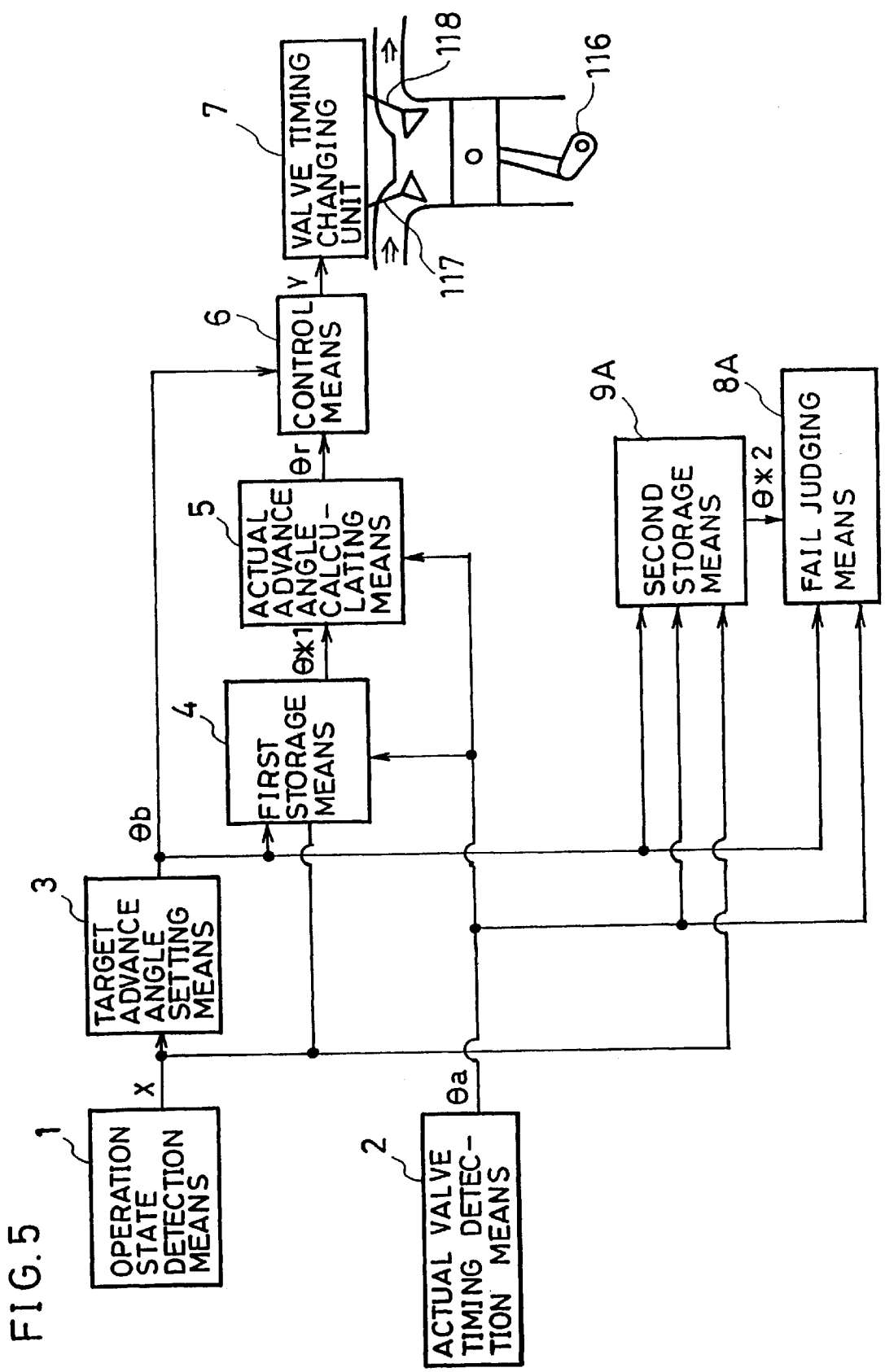
Figure 6:
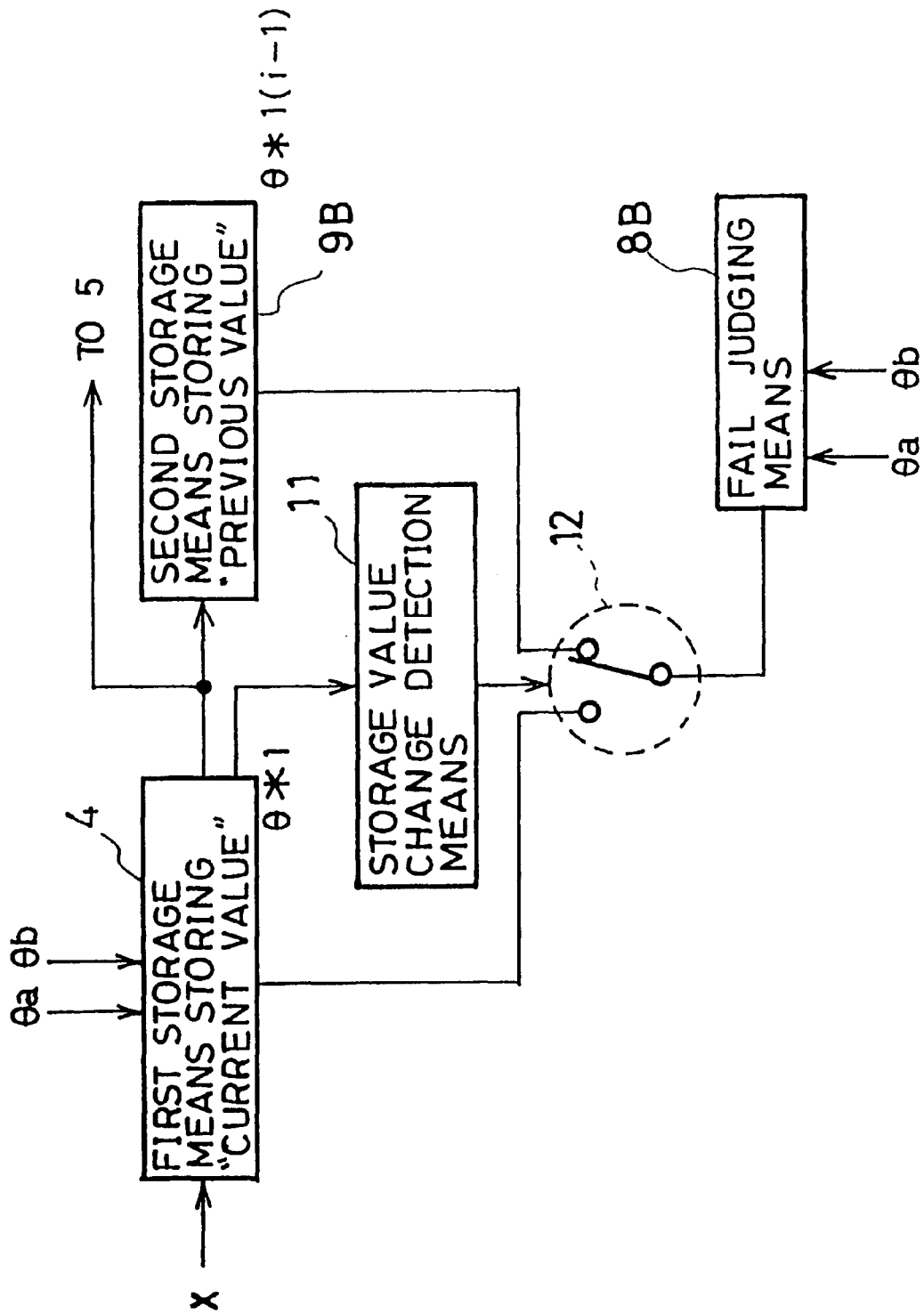
Figure 7:
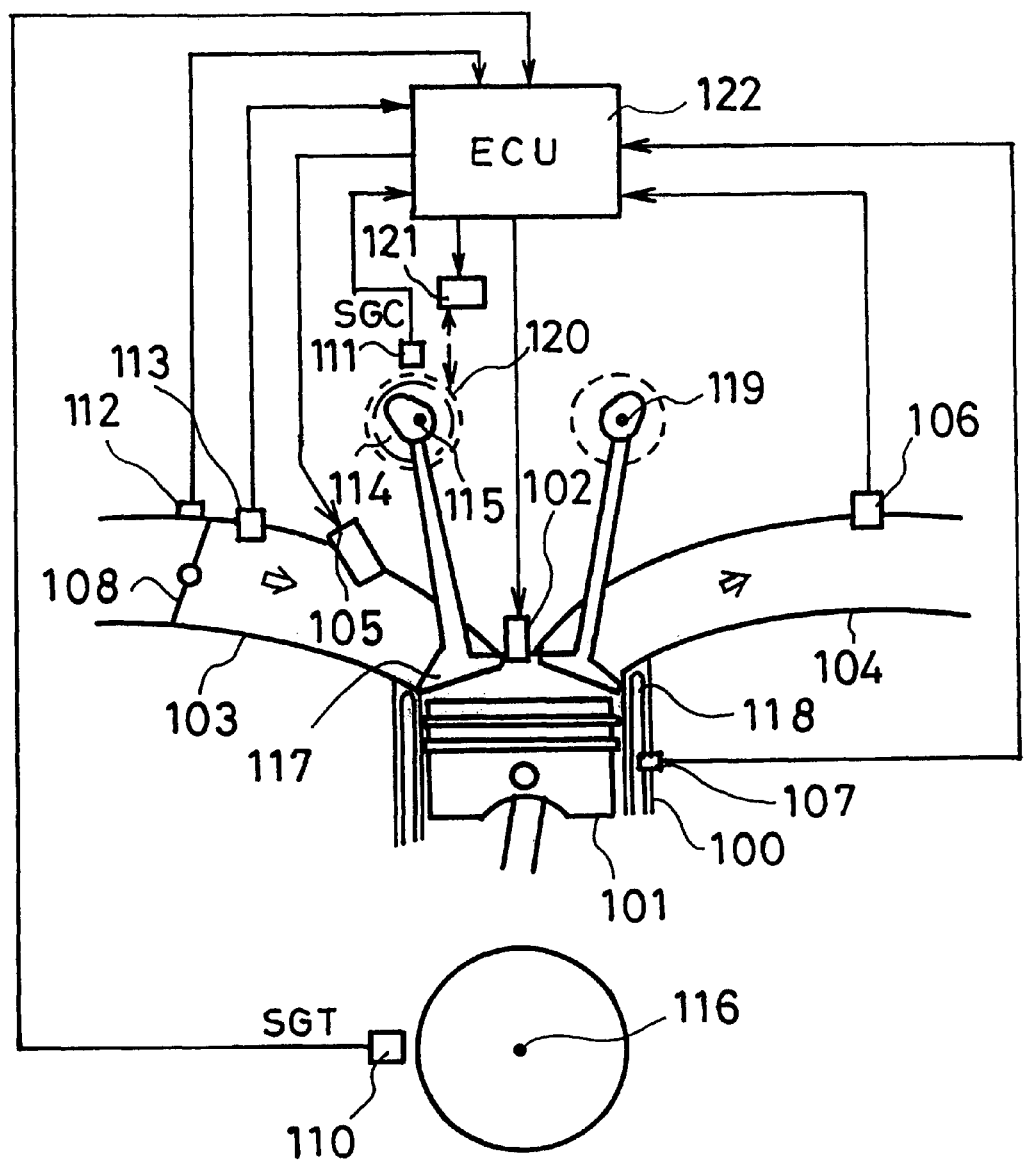
FIG. 7 shows a system for changing only the valve timing on an intake side. The same can be said of a system on an exhaust side.

FIG. 1 is a block diagram of a control system for an internal combustion engine according to Embodiment 1 of the present invention;

FIG. 2 is a timing chart for explaining the operation of the control system for an internal combustion engine of Embodiment 1;

FIG. 3 is a block diagram of a control system for an internal combustion engine according to Embodiment 2 of the present invention;

FIG. 4 is a timing chart for explaining the operation of the control system for an internal combustion engine of Embodiment 2;

FIG. 5 is a block diagram of a control system for an internal combustion engine according to Embodiment 3 of the present invention;

FIG. 6 is a schematic block diagram of a control system for an internal combustion engine according to Embodiment 4 of the present invention;

FIG. 7 is a structural diagram of a prior art control system for an internal combustion engine to which the present invention is applied;

FIG. 8 is a block diagram of a prior art control system for an internal combustion engine; and FIGS. 9 (a), (b) and (c) are timing charts for explaining the operation of a control system for an internal combustion engine of the prior art and the present invention.

DETAILED DESCRIPTION OF THE PREFERRED EMBODIMENTS

In the following embodiments of the present invention, the configuration of a control system for an internal combustion engine itself is the same as that of the prior art system of FIG. 7 and its description is omitted. In the following embodiments, a system for changing only valve timing on an intake side will be described but the same can be said of a system on an exhaust side.

Embodiment 1

Embodiment 1 of the present invention will be described hereinunder with reference to FIG. 1.

FIG. 1 is a block diagram of a control system for an internal combustion engine according to Embodiment 1 of the present invention.

As shown in FIG. 1, the control system for an internal combustion engine (engine control system) comprises operation state detection means 1, actual valve timing detection means 2, target advance angle setting means 3, first storage means 3, actual advance angle calculating means 5, control means 6 and valve timing changing unit 7 as in the prior art system and additionally second storage means 9, storage value update inhibiting means 10 and fail judging means 8A.

The second storage means 9 stores the detection value $\theta a$ of the actual valve timing detection means 2 when the target advance angle $\theta b$ set by the target advance angle setting means 3 is a predetermined value which is a basic position (for example, the position of the slowest or most retarded angle on an intake side and the position of the most advanced angle on an exhaust side).

The storage value update inhibiting means 10 detects a change in the storage value $\theta*1$ of the first storage means 4 and inhibits the update of the storage value $\theta*2$ of the second storage means 9 when this change is equal to or larger than a predetermined value $\theta g$.

The fail judging means 8A judges a fail of the valve timing changing unit 7 based on the target advance angle $\theta b$ set by the target advance angle setting means 3, the detection value θa of the actual valve timing detection means 2 and the storage value θ*2 of the second storage means 9.

The operation of the second storage means 9, the operation of the storage value update inhibiting means 10 and the operation of the fail judging means 8A in the control system for an internal combustion engine according to Embodiment 1 of the present invention will be described hereinunder with reference to FIG. 2.

In FIG. 2, the update of the storage value θ0*2 of the second storage means 9 is inhibited when a change Δθ* in the storage value θ*1 of the first storage means 4 is equal to or larger than the predetermined value θg (for example, 3° CA), that is, Δθ*=|θ*1(i)−θ*1(i−1)|≧3° CA (=θg).

The predetermined value θg must be set to a value equal to or larger than a detection error of the detection value θa of the actual valve timing detection means 2 when the valve timing changing unit 7 is normal and the valve timing is controlled to the slowest angle position.

That is, in this system, the position control of the slowest angle position is limited to less than 3° CA and an error of 3° CA or more is not produced during normal operation. That is, when a value equal to or larger than a change which is not a detection error, that is, 3° CA or more is detected while the valve timing changing unit 7 is normal and the valve timing is controlled to the slowest angle position, fail judgment can be carried out. Since the storage value θ*1 of the first storage value 4 is erroneously learned when the change Δθ* is a detection error of 3° CA or more, to prevent fail judgment using this erroneously learned θ*1, the same value θ*2 as θ*1 before erroneous learning is stored in the second storage means 9 separate from the first storage means 4 and fail judgment is carried out using this value θ*2 when a change which is not a detection error is detected while the valve timing changing unit 7 is normal and the valve timing is controlled to the slowest angle position, thereby eliminating a problem caused by the erroneous learning of the storage value θ*1 of the first storage means 4.

The storage value θ*1 of the first storage means 4 is frequently updated at short intervals of 25 ms whereas the storage value θ*2 of the second storage means 9 is updated at intervals of 100 ms. This update is carried out by supplying a timing clock to the storage means.

That is, the storage value θ*2 of the second storage means 9 is updated at intervals 4 times longer than the intervals of the first storage means 4. That is, the storage value θ*2 is updated less frequently than the storage value θ*1. The update cycles of the first storage means 4 and the second storage means 9 are determined by the cycles of timing clocks supplied to the first storage means 4 and the second storage means 9 from the control means provided separately in the engine control system, respectively. That is, a timing clock signal having a cycle 4 times longer than that of the first storage means 4 is supplied to the second storage means 9.

The fail judging means 8A judges that a fail occurs when a difference between the target advance angle θb and a difference between the detection value θa of the actual valve timing detection means 2 and the storage value θ*2 of the second storage means 9, which is larger than a fail decision advance angle θf2 (for example, 20° CA), that is, |θb−(θa−θ*2)|>θf2 is continued for a fail decision time tf2 (for example, 5 sec) or more.

For instance, when a fail (abnormality in the most advance angle) of the valve timing changing unit 7 occurs that the position of the spool valve is fixed by the OCV 121's biting in of foreign matter and the VVT ACT 114 sticks to the valve timing of the most advance angle position of the intake valve, the detection value θa of the actual valve timing detection means 2 becomes the maxim advance angle θmax.

When the valve timing changing unit 7 is normal, the first storage value (slowest angle learned value) θ*1 of the first storage means 4 and the second storage value θ*2 of the second storage means 9 become almost the same. Suppose that this same value is 15° CA.

If the maximum operation angle θact of the VVT ACT 114 is 45° CA, at the time of the occurrence of the above fail, the detection value θa of the actual valve timing detection means 2 is obtained from the following equation (3).

$$\theta a = \theta max = 15 + 45 = 60[° \text{ CA}] \quad (3)$$

On the contrary, when such a fail occurs that the position of the spool valve of the OCV 121 is fixed and the VVT ACT 114 sticks to the valve timing of the slowest angle position of the intake valve, the actual advance angle θa=15° CA.

When such a fail occurs that the VVT ACT 114 sticks to the valve timing of the most advance angle position of the intake valve during idling, if the target advance angle θb is the slowest angle position (θb=0), the storage value (slowest angle learned value) θ*1 of the first storage means 4 is updated and changed to θmax (=60° CA) before the fail is judged and detected. However, since the slowest angle learned value θ*1 is actually limited to a range between upper and lower limit values (for example, design center value±difference=25±20° CA, upper limit value θ*max=45° CA, lower limit value θ*min=5° CA) in consideration of differences in parts and differences in attachment, it is updated and changed to the upper limit value θ*max (=45° CA).

A change Δθ* in the storage value (slowest angle learned value) θ*1 of the first storage means 4 is obtained from the equation (4) as shown in FIG. 2, the update of the storage value θ* of the second storage means 9 is inhibited, and a normal value (θ*2=15° CA) is retained (ST in FIG. 2).

$$\Delta\theta* = |\theta*1(i) - \theta*1(i-1)| \quad (4)$$
$$= |\theta a(i) - \theta*1(i-1)|$$
$$= |22 - 15| = 7° \text{ CA} \geq 3° \text{ CA}(=\theta g)$$

Thus, by providing the second storage means 9 and the storage value update inhibiting means 10, it is judged that abnormality occurs and a fail which is abnormality in the most advance angle is judged and detected. When update is not inhibited, the storage value θ*2 is updated and changed to θ*max=45° CA with the result that |0−(69−45)|15≦θf2 when the difference between the target advance angle θb and the difference between the detection value θa of the actual valve timing detection means 2 and the storage value θ*2 of the second storage means 9, which is larger than a fail decision advance angle θf2 (for example, 20° CA), that is, |θb−(θa−θ*2)|>θf2 (=20° CA) is continued for a fail decision time tf2 (for example, 5 sec) or more, thereby making it impossible to judge a fail.

In this embodiment, the case where such a fail occurs that the VVT ACT 114 sticks to the valve timing of the most advance angle position of the intake valve has been described. On the contrary, the same can be said of a fail that the VVT ACT 114 sticks to the valve timing of the slowest angle position (abnormality in the slowest angle).

The above fail decision advance angle θf2 is set to different values for a fail that the VVT ACT 114 sticks to the valve timing of the most advance angle position of the intake valve (abnormality in the most advance angle) and for a fail that the VVT ACT 114 sticks to the valve timing of the slowest angle position (abnormality in the slowest angle), thereby making it possible to improve the detectability of a fail.

That is, in the case of a fail that the VVT ACT 114 sticks to the valve timing of the most advance angle position of the intake valve (abnormality in the most advance angle), when the target advance angle θb=0,θa−θ*2 >θf2 (=20° CA) and in the case of a fail that the WT ACT 114 sticks to the valve timing of the slowest angle position of the intake valve (abnormality in the slowest angle), when the target advance angle θb>θbf (=15° CA),θa−θ*2 <θf2'(=5° CA). When this state is continued for the fail decision time tf2 or more, it is judged and detected that the fail occurs.

According to this Embodiment 1, even in such an operation condition as idling during which a fail cannot be judged and detected due to erroneous learning, a fail can be judged and detected, and a control system for an internal combustion engine which can judge and detect a fail of the valve timing changing unit regardless of operation condition can be obtained.

Embodiment 2

Embodiment 2 of the present invention will be described hereinunder with reference to the accompanying drawings.

FIG. 3 is a block diagram of a control system for an internal combustion engine according to Embodiment 2 of the present invention.

As shown in FIG. 3, although the constituent elements of Embodiment 2 are the same as those of Embodiment 1, the function of storage value update inhibiting means is different in this Embodiment 2.

The storage value update inhibiting means 10A in this Embodiment 2 receives a detection result X from the operation state detection means 1, a detection value θa from the actual valve timing detection means 2 and a target advance angle θb from the target advance angle setting means 3, compares the detection value θa from the actual valve timing detection means 2 with the storage value θ*2 of the second storage means 9 when the target advance angle θb set by the target advance angle setting means 3 is a predetermined value (for example, the slowest angle position on an intake side and the most advance angle position on an exhaust side) which is the basic position, and inhibits the update of the storage value θ*2 of the second storage means 9 when a difference between the detection value θa and the storage value θ*2 is equal to or larger than a predetermined value θg'.

With reference to FIG. 4, the operation of the storage value update inhibiting means 10A in the control system for an internal combustion engine according to this Embodiment 2 of the present invention will be described hereinunder.

When the first storage means 4 and the second storage means 9 are under the same condition as shown in FIG. 4, that is, the target advance angle θb during idling is a predetermined value (for example, the slowest angle position on an intake side, that is, θb=0) which is the basic position, if the difference Δθ*' between the detection value θa of the actual valve timing detection means 2 and the storage value θ*2 of the second storage means 9 is equal to or larger than the predetermined value θg' (for example, 3° CA) (that is, as shown in FIG. 4, Δθ*'=|θa−θ*2|≧θg'(=3° CA)), the update of θ*2 is inhibited. That is, it is judged to inhibit the update of the storage value θ*2 of the second storage means 9 without taking into consideration a change in the storage value θ*1 of the first storage means 4.

The predetermined value θg' must be set to a value equal to or larger than a detection error of the detection value θa of the actual valve timing detection means 2 when the valve timing changing unit 7 is normal and the valve timing is controlled to the slowest angle position.

That is, like the above Embodiment 1, in the system of Embodiment 2, the position control of the slowest angle position is limited to less than 3° CA and an error of 3° CA or more is not produced during normal operation.

The difference Δθ*' between the detection value θa of the actual valve timing detection means 2 and the storage value θ*2 of the second storage means 9 is such as shown in the equation (5) shown in FIG. 4, the update of the storage value θ*2 of the second storage means 9 is inhibited, and a regular value (θ*2=15° CA) is retained.

$$\Delta\theta^{*'}=|\theta a-\theta^*2|=\theta a(k)-\theta^*2(k-1)|=|40-15|=25° \text{ CA} \geq 23° \text{ CA}(=\theta g')\quad(5)$$

The fail judging means 8A is identical to that of Embodiment 1 and its description is omitted.

In Embodiment 1, when the change Δθ* of θ*1 is smaller than 3° CA, it is conceivable that θ*2 may be erroneously learned like θ*1 and a fail may not be judged and detected. In Embodiment 2, even when the change Δθ* of θ*1 is smaller than 3° CA, θ*2 is not erroneously learned and hence, a fail can be judged and detected without fail.

In Embodiment 1 and Embodiment 2, to update the storage value θ*2 of the second storage means 9 less frequently than the storage value θ*1 of the first storage means 4, the update cycle of the second storage means 9 is set to 100 ms, four times longer than 25 ms of the first storage means 4. Alternatively, the update cycle of the first storage means 4 may be set to the same value as that of the second storage means 9 (25 ms or SGT) and a filter of the equation (6) may be provided in the second storage means 9.

$$\theta^*2(i)=\theta^*2(i-1)\times(1-K2)+\theta a\times K2 \text{ (K2: constant of filter of second storage means, K2<1)}\quad(6)$$

When a filter of the equation (7) is provided in the first storage means 4, the constant K2 of the filter of the second storage means 9 is set to a value smaller than the constant K1 of the filter of the first storage means 4 so that the storage value θ*2 of the second storage means 9 is updated less frequently than the storage value θ*1 of the first storage means 4.

$$\theta^*1(i)=\theta^*1(i-1)\times(1-K1)+\theta a\times K1\quad(7)$$

(K1: constant of filter of first storage means, K1 ≦1)
$$\theta^*2(i)=\theta^*2(i-1)\times(1-K2)+\theta a\times K2(6')$$
(K2: constant of filter of second storage means, K2<K1 <1)

Embodiment 3

Embodiment 3 of the present invention will be described hereinunder with reference to the accompanying drawings.

FIG. 5 is a block diagram of a control system for an internal combustion engine according to Embodiment 3 of the present invention.

In the control system for an internal combustion engine according to this Embodiment 3, there is provided second storage means 9A for storing the detection value θa of the actual valve timing detection means 2 when the target advance angle θb set by the target advance angle setting means 3 is a predetermined value (for example, the slowest angle position on an intake side and the most advance angle position on an exhaust side) which is the basic position under a predetermined operation condition based on the detection result X of the operation state detection means 1.

The expression "predetermined operation condition" means idling right after the start of an engine, for example. That is, within one operation cycle from start to stop, the storage value of the second storage means 9A is updated only once during idling right after the start of the engine. That is, the signal of the detection result X of the operation state detection means 1 which informs that the operation state becomes idling after the passage of a predetermined time from the start of the engine is output to the second storage means 9A, whereby the detection value θa during idling right after the start of the engine which is the current operation condition is stored in the second storage means 9A (that is, the storage value which is the previous detection value θa during idling right after the start of the engine is updated and changed to the current detection value θa) and then the detection value θa stored in the second storage means 9a is not updated until the engine is stopped.

A fail of the valve timing changing unit 7 is judged using the second storage value θ*2 updated under this operation condition.

In this Embodiment 3, like Embodiments 1 and 2, a fail can be judged and detected even under such an operation condition as idling where a fail cannot be judged and detected due to erroneous learning, and a control system for an internal combustion engine which can judge and detect a fail of the valve timing changing unit regardless of operation condition can be obtained.

Embodiment 4

A control system for an internal combustion engine according to Embodiment 4 of the present invention comprises operation state detection means 1, actual valve timing detection means 2, target advance angle setting means 3, first storage means 4, actual advance angle calculating means 5, control means 6 and valve timing changing unit 7 as in the prior art of FIG. 8 and additionally second storage means 9B of FIG. 6 for storing the previous storage value of the first storage means 4, storage value change detection means 11 for detecting whether a change from the previous storage value (previous value) stored to the current storage value (current value) in the first storage means 4 is equal to or larger than a predetermined value (for example, 3° CA) and fail judging means 8B for judging a fail of the valve timing changing means 7 based on the target advance angle θb, the detection value θa and the storage value (θ*1(i−1)) of the second storage means 9B which is the previous value stored in the first storage means when the storage value change detection means 11 detects that the change is equal to or larger than the predetermined value.

Although the basic operation of this system of Embodiment 4 is the same as the control system of FIG. 8, in this Embodiment 4, when the storage value change detection means 11 detects that the change from the previous storage value stored in the first storage means 4 to the current storage value is equal to or larger than the predetermined value, switching means 12 is operated to output the previous value (θ*1(i−1)) stored in the second storage means to the fail judging means 8B. In this case, fail judgment must be carried out right after the previous value (θ*1(i−1)) is output to the fail judging means 8B. Generally speaking, it is recommended to provide some time margin to a fail decision time as in the above embodiments so as to minimize erroneous judgment, thereby improving reliability. Therefore, in this Embodiment 4, the possibility of erroneous judgment is higher than in the above embodiments. However, since the possibility that a fail cannot be judged due to θr≦θf1 can be reduced more than in the prior art of FIG. 8, the object and effect of the present invention that a fail of the valve timing changing unit can be judged and detected can be attained regardless of operation condition.

According to the present invention, a control system for an internal combustion engine which can judge and detect a fail of the valve timing changing unit regardless of operation condition can be obtained.

What is claimed is:

1. A control system for an internal combustion engine comprising:
   operation state detection means for detecting the operation state of an internal combustion engine;
   a valve timing changing unit for changing the valve timing of at least one of an intake valve and an exhaust valve to change the valve overlap amounts of the intake valve and the exhaust valve,
   actual valve timing detection means for detecting the position of actual valve timing to provide a detection value;
   target advance angle setting means for setting target valve timing based on the detection result of the operation state detection means;
   first storage means for storing the detection value of the actual valve timing detection means when the target advance angle set by the target advance angle setting means is a predetermined value, whose storage value is updated;
   actual advance angle calculating means for calculating the advance angle of a valve based on the storage value of the first storage means and the detection value of the actual valve timing detection means; and
   control means for controlling the valve timing changing unit to change the actual advance angle calculated by the actual advance angle calculating means to the target advance angle set by the target advance angle setting means, wherein
   the system further comprises:
      second storage means for storing the detection value of the actual valve timing detection means when the target advance angle set by the target advance angle setting means is a predetermined value, whose storage value is updated only once during one operation cycle from start to stop; and
      fail judging means for judging a fail of the valve timing changing unit based on the target advance angle set by the target advance angle setting means, the detection value of the actual valve timing detection means and the storage value of the second storage means.

2. The control system for an internal combustion engine according to claim 1, wherein the storage value of the second storage means is updated during each idling right after the start of an engine within each operation cycle.

3. The control system for an internal combustion engine according to claim 1, wherein the fail judging means judges that a fail occurs when a difference between the detection value of the actual valve timing detection means obtained when the target advance angle set by the target advanced angle setting means is the predetermined value and the storage value of the second storage means, which is equal to or larger than a predetermined value, is continued for a predetermined time or more.

* * * * *